(12) United States Patent
Siriwardane et al.

(10) Patent No.: US 9,797,594 B1
(45) Date of Patent: Oct. 24, 2017

(54) TRI-METALLIC FERRITE OXYGEN CARRIERS FOR CHEMICAL LOOPING COMBUSTION

(71) Applicants: Ranjani V. Siriwardane, Morgantown, WV (US); Yueying Fan, Morgantown, WV (US)

(72) Inventors: Ranjani V. Siriwardane, Morgantown, WV (US); Yueying Fan, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 373 days.

(21) Appl. No.: 14/633,175

(22) Filed: Feb. 27, 2015

Related U.S. Application Data

(63) Continuation-in-part of application No. 14/032,628, filed on Sep. 20, 2013, now Pat. No. 9,557,053.

(51) Int. Cl.
*F23C 13/08* (2006.01)
*F23C 10/01* (2006.01)
*F23C 10/02* (2006.01)
*F23C 10/20* (2006.01)

(52) U.S. Cl.
CPC ............. *F23C 13/08* (2013.01); *F23C 10/01* (2013.01); *F23C 10/02* (2013.01); *F23C 10/20* (2013.01)

(58) Field of Classification Search
CPC ...... C10L 2290/02; F23C 13/08; F23C 10/01; F23C 10/02; F23C 10/20
See application file for complete search history.

(56) References Cited

U.S. PATENT DOCUMENTS

| 2,962,445 | A | * | 11/1960 | Pierrot | ................. | C04B 35/265 |
| | | | | | | 252/62.56 |
| 3,024,196 | A | * | 3/1962 | Eckert | ................. | C04B 35/2625 |
| | | | | | | 252/62.6 |
| 5,753,198 | A | * | 5/1998 | Ayala | ................. | B01D 53/02 |
| | | | | | | 423/210 |
| 7,824,655 | B2 | | 11/2010 | Slager et al. | | |
| 8,915,199 | B2 | * | 12/2014 | Bohlig | ................. | F23G 5/027 |
| | | | | | | 110/229 |

(Continued)

OTHER PUBLICATIONS

Jin et al., "Development of a Novel Chemical-Looping Combustion: Synthesis of a Solid Looping Material of NiO/NiAl2O4," Ind. Eng. Chem. Res. 38 (1999).

(Continued)

*Primary Examiner* — Cephia D Toomer
(74) *Attorney, Agent, or Firm* — Timothy L. Harney; Daniel D. Park; Brian J. Lally

(57) ABSTRACT

The disclosure provides a tri-metallic ferrite oxygen carrier for the chemical looping combustion of carbonaceous fuels. The tri-metallic ferrite oxygen carrier comprises $Cu_xFe_yMn_zO_{4-\delta}$, where $Cu_xFe_yMn_zO_{4-\delta}$ is a chemical composition. Generally, $0.5 \leq x \leq 2.0$, $0.2 \leq y \leq 2.5$, and $0.2 \leq z \leq 2.5$, and in some embodiments, $0.8 \leq x \leq 1.2$, $y \leq 1.2$, and $z \geq 0.8$. The tri-metallic ferrite oxygen carrier may be used in various applications for the combustion of carbonaceous fuels, including as an oxygen carrier for chemical looping combustion.

15 Claims, 10 Drawing Sheets

(56) References Cited

U.S. PATENT DOCUMENTS 9,557,053 B1\* 1/2017 Siriwardane ............ F23C 13/08
2017/0073530 A1\* 3/2017 Jin ........................... F24J 2/487

OTHER PUBLICATIONS

Roux et al., "Study and Improvement of the Regeneration of Metallic Oxides Used as Oxygen Carriers f or a New Combustion Process," International Journal of Chemical Reactor Engineering, vol. 4, Art. A38 (2006).

Shulman et al., "Manganese/Iron, Manganese/Nickel, and Manganese/Silicon Oxides Used in Chemical-Looping With Oxygen Uncoupling (CLOU) for Combustion of Methane," Energy Fuels 23 (2009).

Wang et al., "Investigation of Chemical Looping Combustion of Coal with CuFe2O4 Oxygen Carrier," Energy Fuels 25 (2011).

Siriwardane et al., "Evaluation of reaction mechanism of coal-metal oxide interactions in chemical-looping combustion," Combustion and Flame 157 (2010).

\* cited by examiner

TRI-METALLIC FERRITE OXYGEN CARRIERS FOR CHEMICAL LOOPING COMBUSTION

GOVERNMENT INTERESTS

The United States Government has rights in this invention pursuant to the employer-employee relationship of the Government to the inventors as U.S. Department of Energy employees and site-support contractors at the National Energy Technology Laboratory.

RELATION TO OTHER APPLICATIONS

This patent application claims priority from nonprovisional patent application Ser. No. 14/032,628 filed Sep. 20, 2013, which is hereby incorporated by reference.

FIELD OF THE INVENTION

The disclosure provides a tri-metallic oxygen carrier for the chemical looping combustion of carbonaceous fuels, such as $CH_4$, $CO$, $H_2$, coal, coke, biomass char, and the like. The tri-metallic ferrite oxygen carrier comprises $Cu_xFe_yMn_zO_{4-\delta}$ on an inert support, where $Cu_xFe_yMn_zO_{4-\delta}$ is a chemical composition and typically $0.5 \leq x \leq 2.0$, $0.2 \leq y \leq 2.5$, and $0.2 \leq z \leq 2.5$, and $-0.5 \leq \delta \leq 0.5$.

BACKGROUND

In certain applications metal-oxide oxygen carriers are utilized for the delivery of oxygen via reduction. One such application which has been investigated extensively is chemical looping combustion. Chemical looping combustion systems generally utilize a fuel reactor, an air reactor, and a metal oxide oxygen carrier undergoing reduction in the fuel reactor and oxidation in the air reactor. The reduction in the fuel reactor is facilitated by close contact between a fuel and the oxygen carrier. The subsequent oxidation of the carrier in the air reactor is an exothermic process, and a stream of $N_2$ is exhausted from the air reactor and carries the heat of oxidation to an attached power generation island.

Chemical looping combustion cycles provide potentially significant advantages. The enhanced reversibility of the two redox reactions offers improved efficiencies over traditional single stage combustions, where the release of a fuel's energy occurs in a highly irreversible manner. Further, with appropriate oxygen carriers, both redox reactions can occur at relatively low temperatures, allowing a power station to more closely approach an ideal work output without exposing components to excessive working temperatures. Additionally, and significantly, chemical looping combustion can serve as an effective carbon capture technique. Of the two flue gas streams generated, one is comprised of atmospheric $N_2$ and residual $O_2$, but sensibly free of $CO_2$, while the second stream is comprised of $CO_2$ and $H_2O$, and contains almost all of the $CO_2$ generated by the system. It is relatively uncomplicated to remove the water vapor, leading to a stream of almost pure $CO_2$. For these reasons, chemical looping combustion systems have been extensively investigated. However, necessary characteristics of the oxygen carrier such as sufficient durability and reactivity have limited the success, particularly when the fuel utilized has been introduced to the fuel reactor as a solid such as carbon, coal, or biomass. Challenges associated with the chemical looping combustion of solid carbonaceous fuels include achieving sufficient combustion rates suitable for various reactor systems, sufficient oxygen release capacity facilitating the fuel-oxygen carrier interactions, stable reactivity during multiple cycles, [high attrition resistance, and low reactivity with ash and other contaminants].

A variety of metal oxides have been evaluated for suitability as oxygen carriers in chemical looping combustion systems. Metal oxides based on Ni, Fe, Co, Cu and Mn have a good affinity with CO and are thermodynamically feasible as oxygen carriers, however, $Mn_2O_3$, $Co_3O_4$ and CuO decompose at relatively low temperatures. CuO has also been extensively investigated, but the low melting point and agglomeration issues introduce significant difficulties. $Fe_2O_3$ generally exhibits improved temperature stability, however the reactivity of $Fe_2O_3$ is significantly limited as compared to Cu-based oxygen carriers. Additionally, $Fe_2O_3$ requires relatively high temperatures as compared to CuO. These characteristics reduce overall system performance and increase the complexity of heat transfer requirements in a working system. Mixed systems have also been evaluated in an attempt to optimize the characteristics of the individual constituents. See e.g., Wang et al., "Investigation of Chemical Looping Combustion of Coal with $CuFe_2O_4$ Oxygen Carrier," *Energy Fuels* 25 (2011); see also U.S. patent application Ser. No. 13/159,553 by Siriwardane et al., filed Jun. 14, 2011. Iron (Fe) and manganese (Mn) compounds have also been investigated as oxygen carriers. See Shulman et al., "Manganese/Iron, Manganese/Nickel, and Manganese/Silicon Oxides Used in Chemical-Looping With Oxygen Uncoupling (CLOU) for Combustion of Methane," *Energy Fuels* 23 (2009).

It would be advantageous to provide a tri-metallic ferrite oxygen carrier having improved durability and reactivity over metal oxides currently used in the chemical looping combustion of carbonaceous fuels. It would be additionally advantageous if the tri-metallic ferrite oxygen carriers exhibited improved reduction rates over typically used materials such as $Fe_2O_3$, and were comparable with CuO while avoiding the associated agglomeration issues. It would be particularly advantageous if the tri-metallic ferrite oxygen carriers were comparable in cost to $Fe_2O_3$ and could be prepared using readily available materials.

These and other objects, aspects, and advantages of the present disclosure will become better understood with reference to the accompanying description and claims.

SUMMARY

The disclosure provides a tri-metallic ferrite oxygen carrier for the chemical looping combustion of carbonaceous fuels. The tri-metallic ferrite oxygen carrier comprises $Cu_xFe_yMn_zO_{4-\delta}$, where $Cu_xFe_yMn_zO_{4-\delta}$ is a chemical composition with generally $0.5 \leq x \leq 2.0$, $0.2 \leq y \leq 2.5$, and $0.2 \leq z \leq 2.5$. In a particular embodiment, $0.8 \leq x \leq 1.2$, $0.2 \leq y \leq 1.2$, and $0.8 \leq z \leq 2.5$. For example, the $Cu_xFe_yMn_zO_{4-\delta}$ may be an oxide compound of $CuFeMnO_4$, $CuFeMn_2O_4$, or $CuFe_{0.5}Mn_{1.5}O_4$, among others.

In some embodiments the tri-metallic ferrite oxygen carrier comprises $Cu_xFe_yMn_zO_{4-\delta}$ on an inert support. The inert support disperses the $Cu_xFe_yMn_zO_{4-\delta}$ and may mitigate agglomeration and improve performance stability. In an embodiment, the inert support comprises from about 5 weight percent (wt. %) to about 60 wt. % of the tri-metallic ferrite oxygen carrier and the $Cu_xFe_yMn_zO_{4-\delta}$ comprises at least 30 wt. % of the tri-metallic ferrite oxygen carrier.

The tri-metallic ferrite oxygen carrier may be utilized for the combustion of a solid carbonaceous fuel by delivering the tri-metallic ferrite oxygen carrier to a fuel reactor and mixing the carbonaceous fuel and the tri-metallic ferrite oxygen carrier at a reducing temperature, such that some portion of the tri-metallic ferrite oxygen carrier is reduced and some portion of the carbonaceous fuel is oxidized. Within the fuel reactor, the tri-metallic ferrite oxygen carrier interacts with the carbonaceous fuel and generates a reduced carrier. The reduced carrier may subsequently enter an oxidation reactor receiving a flow of oxidizing gas such as air to generate a re-oxidized carrier in an oxidizing reaction. The re-oxidized carrier comprises $Cu_xFe_yMn_zO_{4-\delta}$ and may be returned to the fuel reactor for a cyclic operation. In an embodiment, the reducing and oxidizing temperatures are from about 600° C. to about 1200° C.

Embodiments of the tri-metallic ferrite oxygen carriers disclosed are further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process for chemical looping combustion of a carbonaceous fuel utilizing a tri-metallic ferrite oxygen carrier comprising $Cu_xFe_yMn_zO_{4-\delta}$.

The disclosure provides a tri-metallic ferrite oxygen carrier having improved durability and reactivity over metal oxides currently used in the chemical looping combustion of carbonaceous fuels, such as $CH_4$, $CO$, $H_2$. coal, coke, biomass char, and the like. The tri-metallic ferrite oxygen carrier comprises $Cu_xFe_yMn_zO_{4-\delta}$, where $Cu_xFe_yMn_zO_{4-\delta}$ is a chemical composition with $0.5 \leq \delta \leq 0.5$ and generally $0.5 \leq x \leq 2.0$, $0.2 \leq y \leq 2.5$, and $0.2 \leq z \leq 2.5$. In a particular embodiment, $0.8 \leq x \leq 1.2$, $y \leq 1.2$, and $z \geq 0.8$. In some embodiments, the tri-metallic ferrite oxygen carrier further comprises an inert support to further avoid agglomeration and improve the performance stability of the tri-metallic ferrite oxygen carriers. The tri-metallic ferrite oxygen carrier is effective for use as an oxygen carrier in chemical looping combustion applications for the combustion of carbonaceous fuels, as well as other applications where the transport of oxygen is facilitated through the reduction and subsequent re-oxidation of an oxygen carrier.

Figure 1:
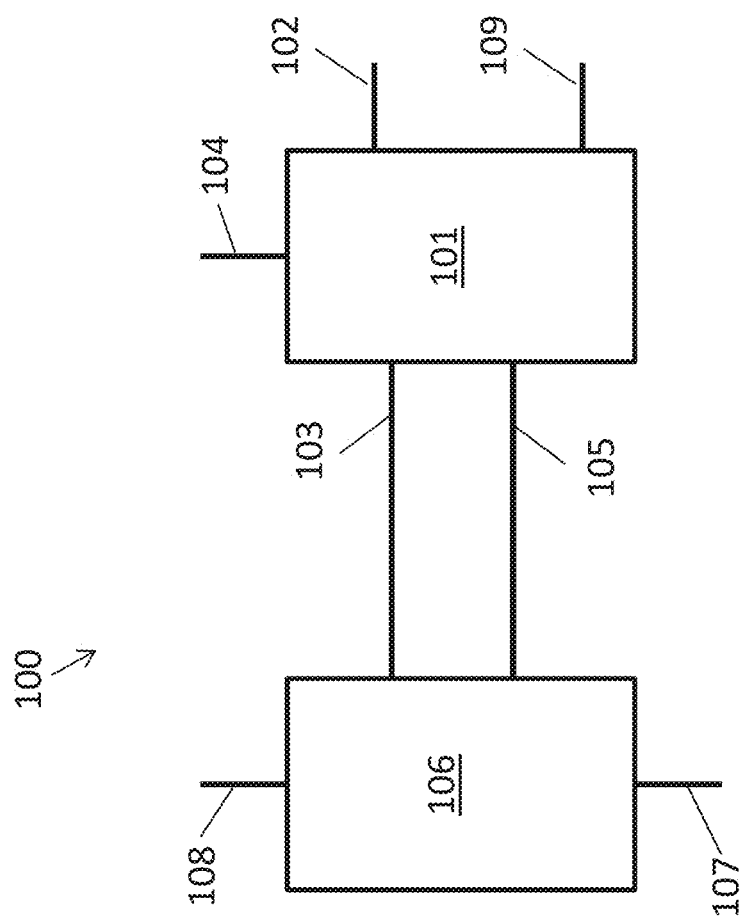
FIG. 1 illustrates a chemical looping combustion process utilizing a tri-metallic ferrite oxygen carrier.

A chemical looping combustion system within which the tri-metallic ferrite oxygen carrier disclosed here may be utilized is illustrated at FIG. 1. FIG. 1 illustrates a chemical combustion system generally at 100 and includes fuel reactor 101. Fuel reactor 101 receives a fuel flow of carbonaceous fuel at 102 and the tri-metallic ferrite oxygen carrier at 103, and provides mixing among the carbonaceous fuel and the tri-metallic ferrite oxygen carrier. Fuel reactor 101 is at a reducing temperature sufficient to reduce at least a portion of the tri-metallic ferrite oxygen carrier. In an embodiment, the reducing temperature is from about 600° C. to about 1200° C. In certain embodiments, fuel reactor 101 may also receive a flow of gasification agent at 109. such as steam, and $CO_2$, or any other agent intended to generate gaseous products from the carbonaceous fuel within fuel reactor 101. Within fuel reactor 101, tri-metallic ferrite oxygen carrier interacts with the carbonaceous fuel, and the $Cu_xFe_yMn_zO_{4-\delta}$ comprising the tri-metallic ferrite oxygen carrier reduces to a reduced carrier.

Following the reduction, an exhaust stream comprised of $CO_2$ and possibly $H_2O$ may exit fuel reactor 101 at exhaust 104, and the reduced carrier may exit fuel reactor 101 at 105. The reduced carrier exiting fuel reactor 101 at 105 may subsequently enter oxidation reactor 106. Oxidation reactor 106 further receives a flow of oxidizing gas such as air, and facilitates contact between the reduced carrier and the oxidizing gas, generating a re-oxidized carrier. The re-oxidized carrier is generated by an oxidizing reaction. The reactants of the oxidizing reaction are some portion of the oxygen from the oxidizing gas and some portion of the reduced carrier, and the product of the oxidizing reaction is the re-oxidized carrier, where the re-oxidized carrier comprises $Cu_xFe_yMn_zO_{4-\delta}$. Generally, the $Cu_xFe_yMn_zO_{4-\delta}$ comprising the re-oxidized carrier is substantially equivalent to the $Cu_xFe_yMn_zO_{4-\delta}$ comprising the tri-metallic ferrite oxygen carrier. For example, when the tri-metallic ferrite oxygen carrier generally comprises $CuFeMnO_4$ on the inert support, then oxidation of the reduced carrier correspondingly generates a re-oxidized carrier generally comprising $CuFeMnO_4$. Oxidation reactor 106 is at an oxidation temperature sufficient to oxidize at least a portion of the reduced carrier. In an embodiment, the oxidizing temperature is from about 600° C. to about 1200° C.

In some embodiments, the tri-metallic oxygen carrier further comprises an inert support to aid in the dispersal of the $Cu_xFe_yMn_zO_{4-\delta}$. The inert support material does not participate in the oxidation and reduction reactions of the $Cu_xFe_yMn_zO_{4-\delta}$ oxides comprising the tri-metallic ferrite oxygen carrier. In an embodiment, the inert support comprises from about 5 wt. % to about 60 wt. % of the tri-metallic ferrite oxygen carrier and $Cu_xFe_yMn_zO_{4-\delta}$ comprises at least 30 wt. % of the tri-metallic ferrite oxygen carrier. In an embodiment, the inert support comprises $Al_2O_3$, $CaFe_2O_4$, or bentonite.

Within this disclosure, "$Cu_xFe_yMn_zO_{4-\delta}$" means an oxide compound where the oxide compound is a stoichiometric or non-stoichiometric chemical compound comprised of copper, iron, and manganese as cations and oxygen as an anion. The copper, iron, manganese, and oxygen may be present in the oxide compound in any relative amount. Generally, the copper, iron, manganese, and oxygen are present relative amounts such that $0.5 \leq x \leq 2.0$, $0.2 \leq y \leq 2.5$, and $0.2 \leq z \leq 2.5$, and $-0.5 \leq \delta \leq 0.5$. In a particular embodiment, $0.8 \leq x \leq 1.2$, $y \leq 1.2$, and $z \geq 0.8$. For example, the $Cu_xFe_yMn_zO_{4-\delta}$ may be an oxide compound of $CuFeMnO_4$, $CuFeMn_2O_4$, or $CuFe_{0.5}Mn_{1.5}O_4$, among others.

Within this disclosure, "reducing" or "reduction" as it applies to a tri-metallic ferrite oxygen carrier means the loss of oxygen from the $Cu_xFe_yMn_zO_{4-\delta}$ comprising the tri-metallic ferrite oxygen carrier. "Oxidizing" or "oxidation" as it applies to a tri-metallic ferrite oxygen carrier means a reaction with oxygen and the reduced carrier which generates $Cu_xFe_yMn_zO_{4-\delta}$. Similarly, a "reducing temperature" is a temperature sufficient to generate reduction and an "oxidizing temperature" is a temperature sufficient to generate oxidation under other prevailing and germane existing conditions.

Within this disclosure, "carbonaceous fuel" means a fuel comprising hydrogen and carbon. For example, a fuel comprising $H_2$, CO, a hydrocarbon, or combinations thereof. "Gaseous carbonaceous fuel" means a carbonaceous fuel existing as a gas while "solid carbonaceous fuel" means a fuel comprising solid carbon, such as coal, coke, coal and biomass char, and the like.

Within this disclosure, "mixing" as it pertains to a tri-metallic ferrite oxygen carrier and a carbonaceous fuel means bringing the tri-metallic ferrite oxygen carrier and the carbonaceous fuel and/or some component thereof into sufficient proximity such that the $Cu_xFe_yMn_zO_{4-\delta}$ comprising the tri-metallic ferrite oxygen carrier reduces to a reduced carrier at the reducing temperature within the fuel reactor.

As stated and as is understood, the tri-metallic ferrite oxygen carrier may also be made up of additional components outside of $Cu_xFe_yMn_zO_{4-\delta}$. In an embodiment, the $Cu_xFe_yMn_zO_{4-\delta}$ comprises at least 10 wt. % of the tri-metallic ferrite oxygen carrier. In another embodiment, the $Cu_xFe_yMn_zO_{4-\delta}$ comprises at least 25 wt. % of the tri-metallic ferrite oxygen carrier, and in a further embodiment, the $Cu_xFe_yMn_zO_{4-\delta}$ comprises at least 50 wt. % of the tri-metallic ferrite oxygen carrier. In an additional embodiment, an oxygen carrier comprises a plurality of components where each component in the plurality undergoes a reduction reaction in contact with the carbonaceous fuel, and the tri-metallic ferrite oxygen carrier comprises at least 10 wt. %, at least 25 wt. %, or at least 50 wt. % of the plurality of components.

Additionally, in an embodiment, the tri-metallic ferrite oxygen carrier is a plurality of oxygen carrier pellets where each oxygen carrier pellet in the plurality comprises $Cu_xFe_yMn_zO_{4-\delta}$. In an additional embodiment, a Sauter mean diameter of the plurality of oxygen carrier pellets is less than about 200 micron (μm), preferably less than about 100 μm. The Sauter mean diameter may be determined by means known in the art such as sieving, microscopy, sedimentation, permeametry, laser diffraction, or other means, or as reported by a manufacturer of such as-described pellets or the operating instructions of machinery intended to produce such as-described pellets. See e.g., Martin Rhodes, *Introduction to Particle Technology* ($2^{nd}$ ed. 2008). The use of such sized pellets as described can promote contact between the tri-metallic ferrite oxygen carrier and the carbonaceous fuel, enhancing the reaction mechanisms. When a gasification agent is used for gasifying a solid carbonaceous fuel, the particle size of the carrier pellet may vary depending on the type of reactor bed used. In case of a fluid bed reactor, particle size may be 100-500 μm, while in moving bed applications the particle size may be 1-5 mm.

The oxidizing reaction occurring in oxidation reactor 106 is an exothermic reaction, and heat generated is carried from oxidizing reactor 106 by a gaseous flow exiting at 108. The gaseous flow exiting at 108 is comprised of the oxidizing gas less that oxygen utilized for the generation of the re-oxidized carrier, and may be sent to and utilized by a power generation cycle. For example, when the flow of oxidizing gas is air, the gaseous flow exiting at 108 is comprised of $N_2$ and possibly some remaining $O_2$, and other components. The re-oxidized carrier may be subsequently transported to fuel reactor 101 for use as the tri-metallic ferrite oxygen carrier in a cyclic operation.

Figure 2:
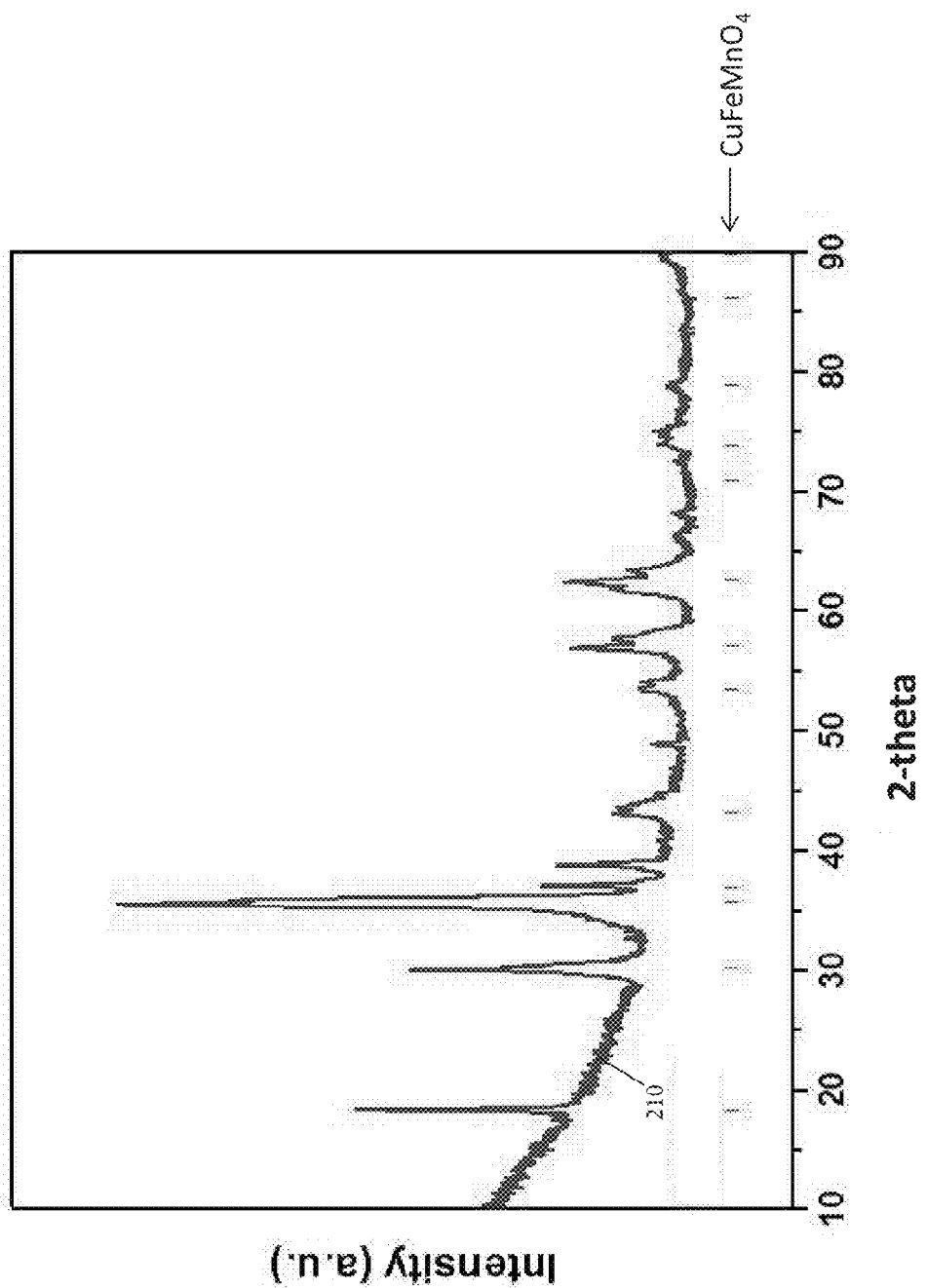
FIG. 2 illustrates XRD results for a tri-metallic ferrite oxygen carrier comprising $CuFeMnO_4$.

The presence of $Cu_xFe_yMn_zO_{4-\delta}$ within the tri-metallic ferrite oxygen carrier may be indicated by means known in the art, such as X-ray diffraction (XRD) analyses. For example, FIG. 2 illustrates XRD patterns obtained before reduction of a tri-metallic ferrite oxygen carrier where the $Cu_xFe_yMn_zO_{4-\delta}$ generally comprised $CuFeMnO_4$. As illustrated at FIG. 2, trace 210 indicates the presence of $CuFeMnO_4$ as evidenced by the peaks on trace 210 located at the 2-theta markers generally indicated by $CuFeMnO_4$.

In some embodiments the reduced carrier may comprise reduced components comprising a $Cu_aO_b$ component, a $Fe_cO_d$ component, an $Mn_eO_f$ component, or combinations thereof. In this embodiment, the $Cu_aO_b$ component, the $Fe_cO_d$ component, and the $Mn_eO_f$ component comprises some portion of the $Cu_xFe_yMn_zO_{4-\delta}$ which comprised the tri-metallic ferrite oxygen carrier. Further, in some embodiments, a>0 and b≥0 such that the $Cu_aO_b$ component comprises copper or a copper oxide, c>0 and d≥0 such that the $Fe_cO_d$ component comprises iron or an iron oxide, and/or e>0 and f≥0 such that the $Mn_eO_f$ component comprises manganese or a manganese oxide.

It is understood that FIG. 1 provides an exemplary application illustrating a chemical looping combustion process, however the specifics of the process illustrated are not intended to be limiting. Within this disclosure, it is only necessary that a tri-metallic ferrite oxygen carrier be delivered to a fuel reactor, where the tri-metallic ferrite oxygen carrier comprises $Cu_xFe_yMn_zO_{4-\delta}$, and that the tri-metallic ferrite oxygen carrier mix with a carbonaceous fuel at a reducing temperature sufficient to reduce some portion of the tri-metallic ferrite oxygen carrier and oxidize some portion of the carbonaceous fuel.

Figure 3:
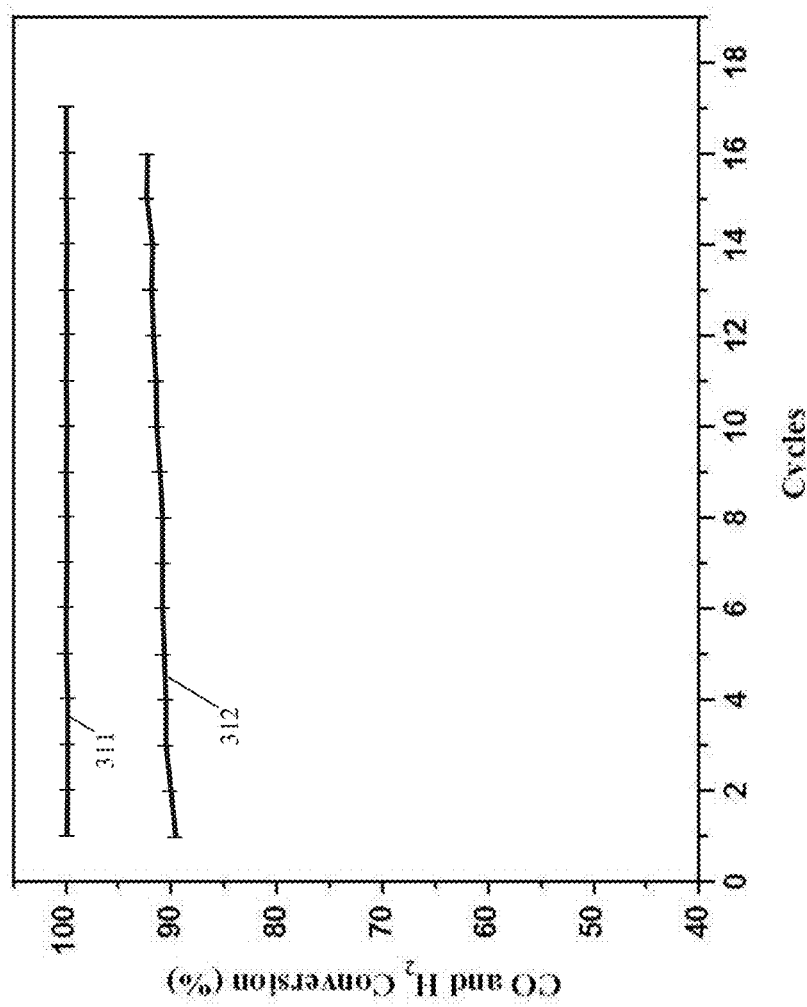
FIG. 3 illustrates tri-metallic ferrite oxygen carrier performance using syngas.
Figure 4:
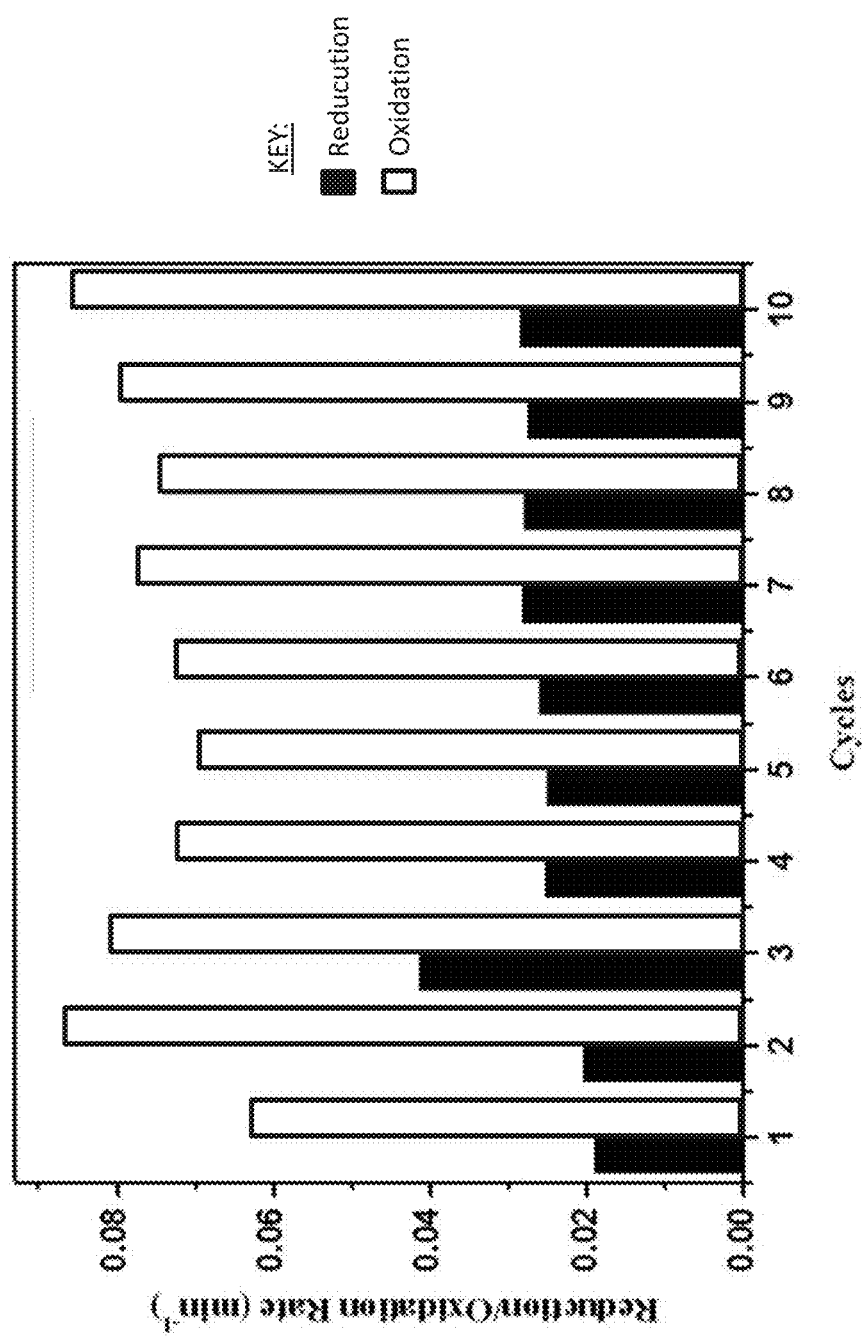
FIG. 4 illustrates tri-metallic ferrite oxygen carrier performance for solid carbon.

As stated, the carbonaceous fuel may be a gaseous of solid carbonaceous fuel as indicated by FIGS. 3 and 4. FIG. 3 illustrates the reaction of synthesis gas with 5 grams of $CuFeMnO_4$ without an inert support at 800° C. A syngas of $H_2$: 10.28%, CO: 6.39%, $CO_2$: 2.04% balanced by He was introduced into a reactor at a flow rate of 100 sccm at 800° C. for 10 min for reduction and 100 sccm house air was used for oxidation of the reduced samples. At FIG. 3, trace 311 indicates $H_2$ conversion while trace 312 indicates CO conversion. The data in FIG. 3 shows that $H_2$ conversion was 100%, while 90% of CO was converted into $CO_2$ with the $CuFeMnO_4$ tri-metallic oxide carrier. FIG. 4 illustrates a cyclic performance of carbon CLC with a tri-metallic carrier comprising $CuFeMnO_4$ tested in the thermogrametric analysis (TGA). 1.25 g of 20% $Al_2O_3/CuFeMnO_4$ was mixed with 100 mg carbon and was loaded in the TGA. Then the TGA was heated to 1000° C. at a ramping rate of 5° C./min under $N_2$ at a flow rate of 100 sccm and kept at 1000° C. until there was no weight loss. The zero-grade air at a flow rate of 200 sccm was introduced for oxidation. The reaction rate of the oxygen carrier with carbon was calculated using TGA data as follows:

Reduction rate=$dX/dt$, $X=(M_o-M)/(M_o-M_f)$

Oxidation rate=$dX/dt$, $X=(M-M_f)/(M_{oxd}-M_f)$ where M is the instantaneous weight of the oxygen carrier-carbon mixture, $M_o$ is the initial weight of the oxygen carrier-carbon mixture, $M_f$ is the weight of the reduced metal after the reduction, and $M_{oxd}$ is the weight of the completed oxidized sample after introducing air. The reaction rate dx/dt was calculated by differentiating the fifth-order polynomial equation. FIG. 4 illustrates the reduction and oxidation rates and reaction temperature corresponding to the maximum reaction rate during cyclic TGA tests of carbon with 20% $Al_2O_3/CuFeMnO_4$, with oxidation and reduction cycles corresponding to the KEY. $CuFeMnO_4$ showed stable reduction rates during cyclic tests. $CuFeMnO_4$ appears to be a suitable oxygen carrier for carbon/coal CLC.

Figure 5:
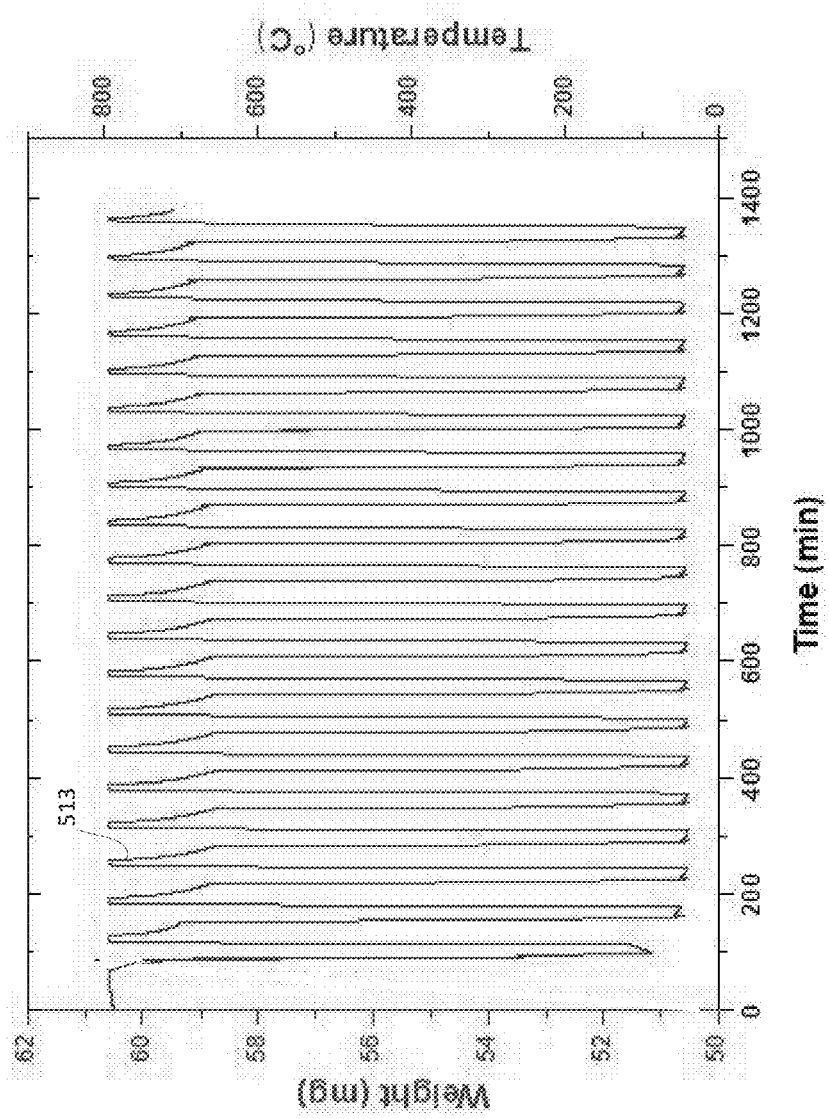
FIG. 5 illustrates TGA screening for a tri-metallic ferrite oxygen carrier comprising $CuFeMn_2O_4$.
Figure 6:
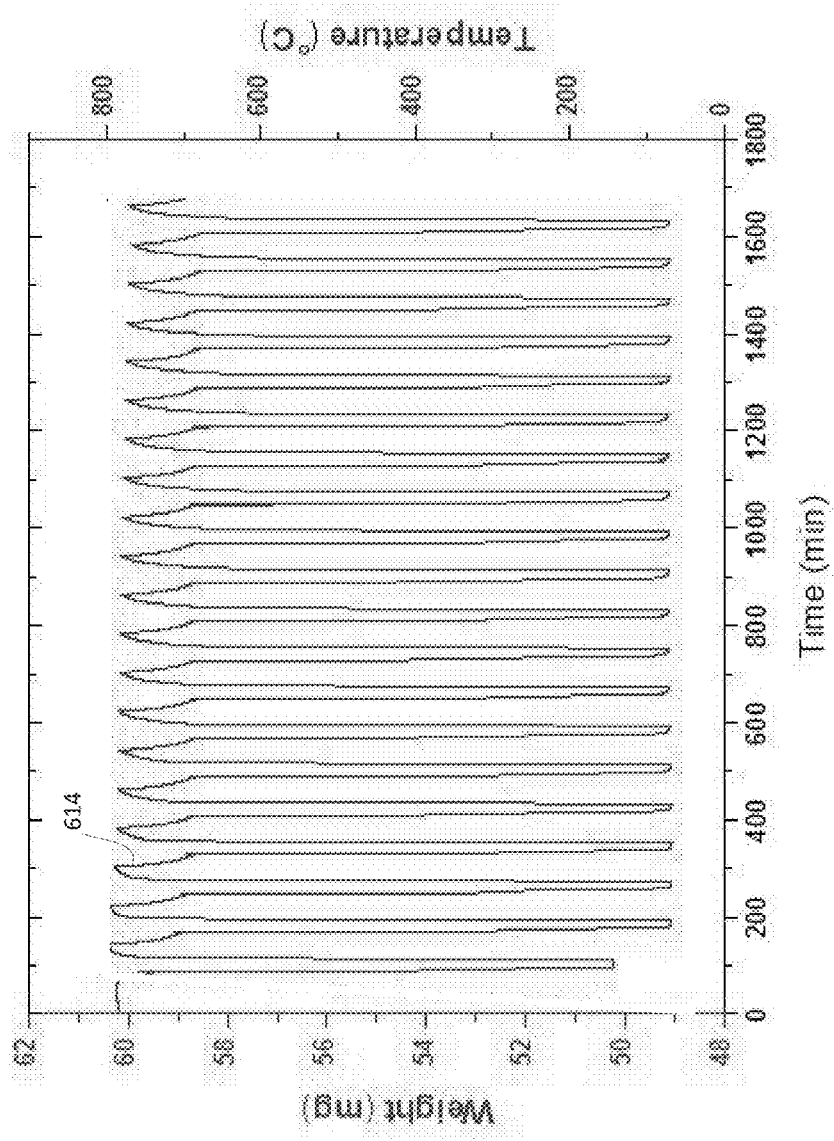
FIG. 6 illustrates TGA screening for a tri-metallic ferrite oxygen carrier comprising $CuFeMnO_4$
Figure 7:
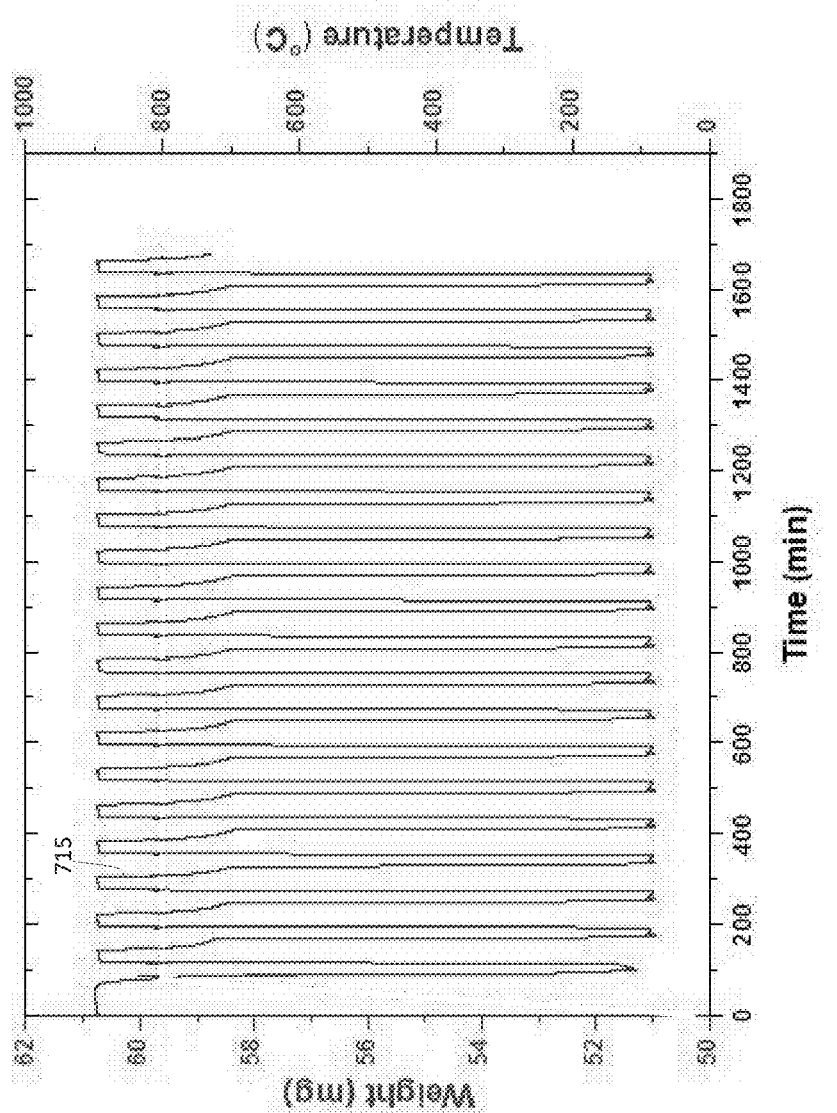
FIG. 7 illustrates TGA screening for a tri-metallic ferrite oxygen carrier comprising $CuFe_{0.5}Mn_{1.5}O_4$.
Figure 8:
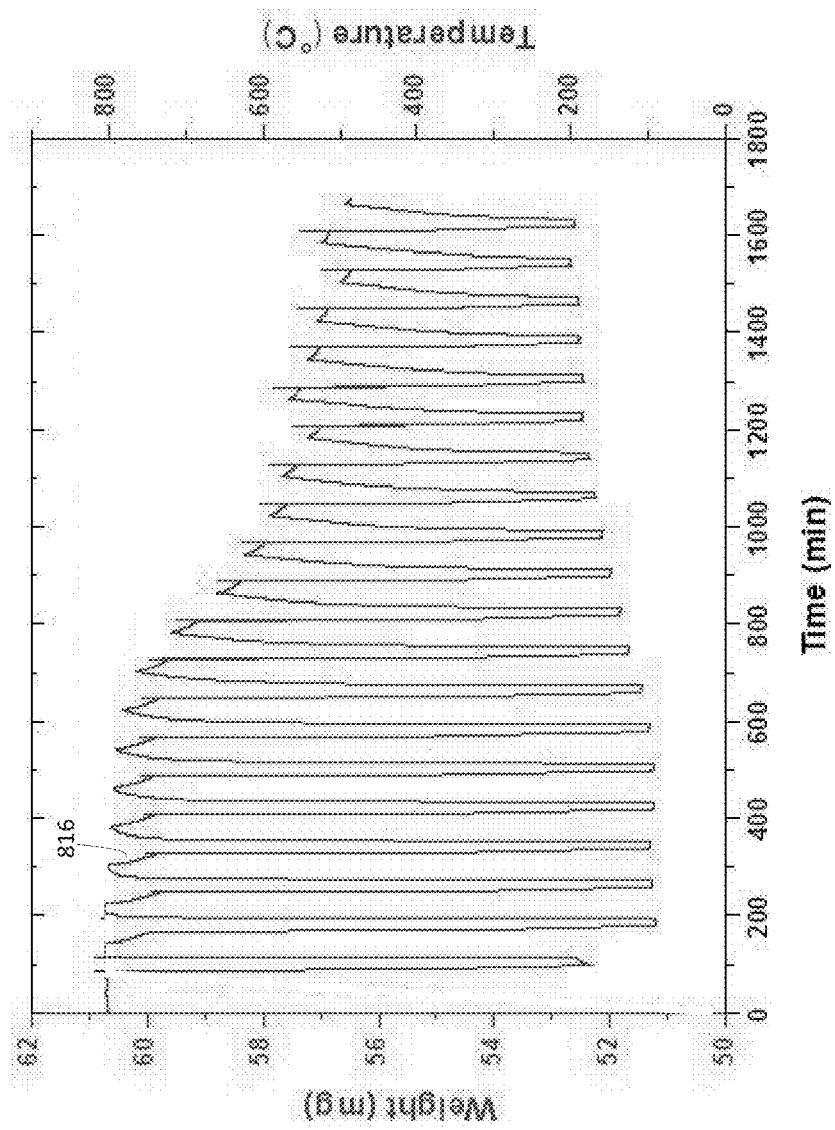
FIG. 8 illustrates TGA screening for a tri-metallic ferrite oxygen carrier comprising $Cu_{0.5}Fe_{1.5}MnO_4$.
Figure 9:
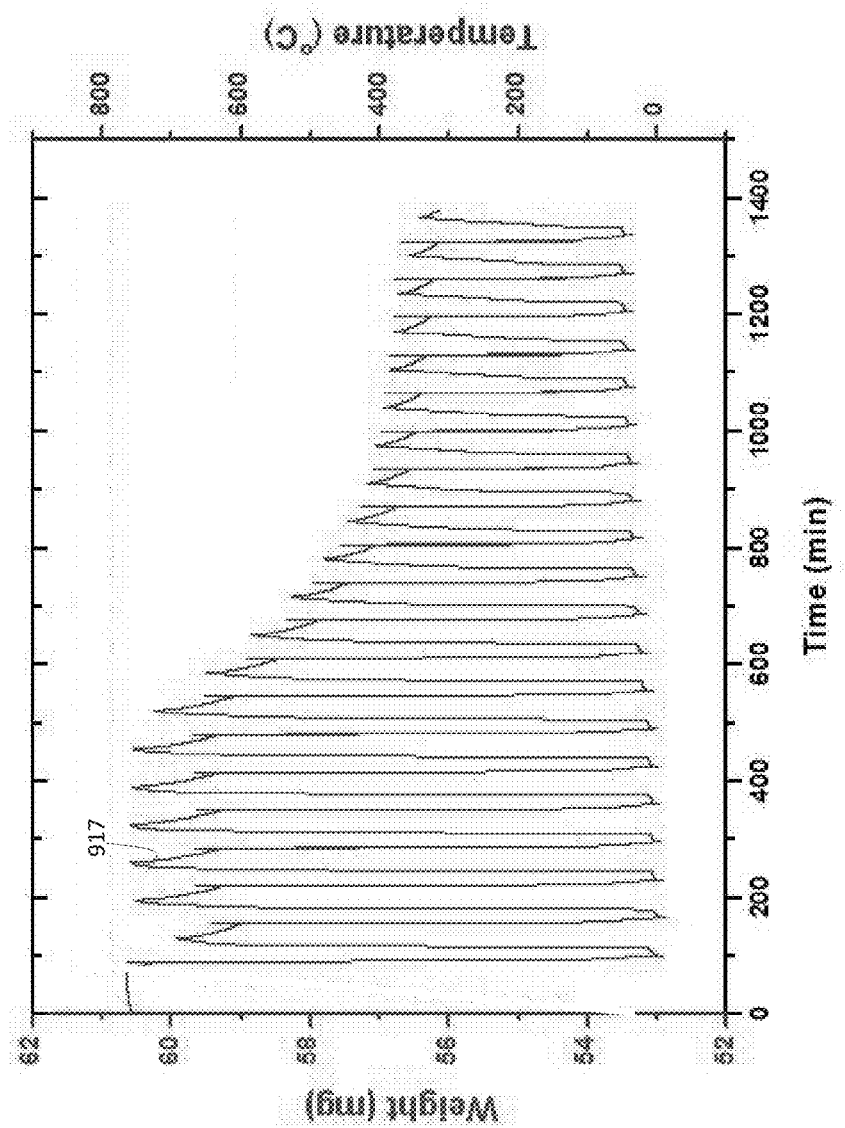
FIG. 9 illustrates TGA screening for a tri-metallic ferrite oxygen carrier comprising $CuFe_2MnO_4$.
Figure 10:
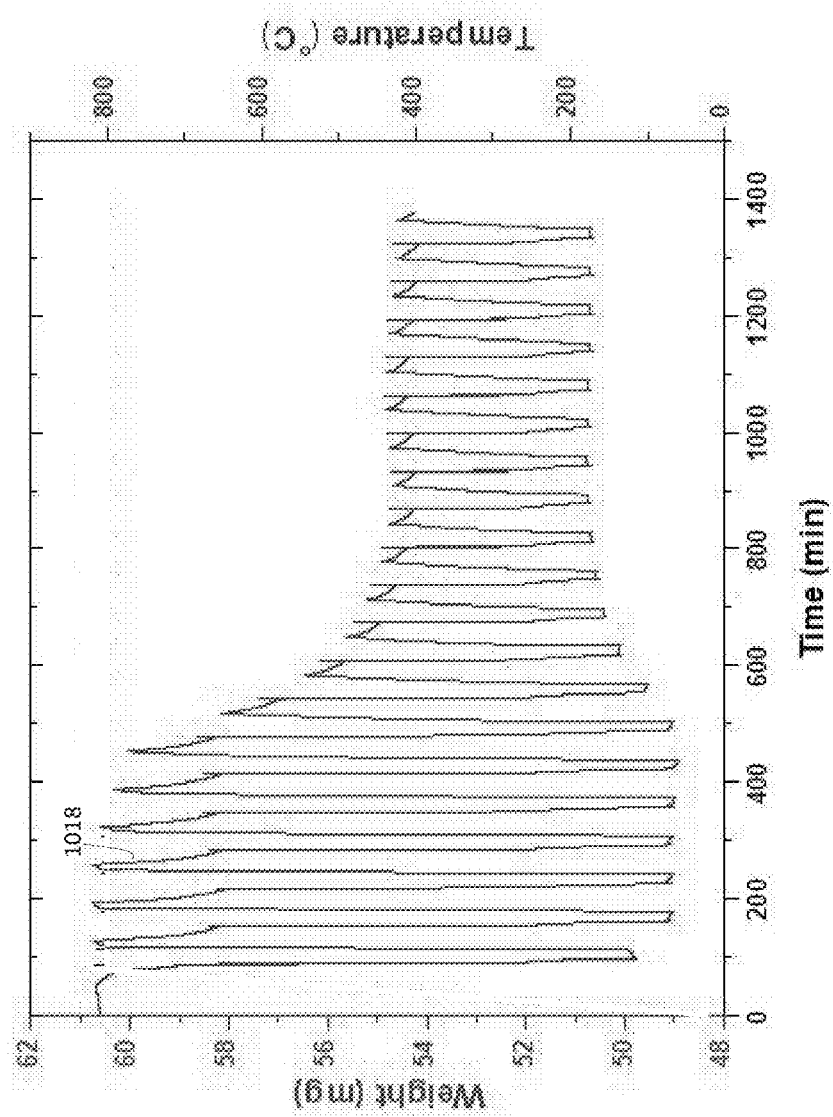
FIG. 10 illustrates TGA screening for a tri-metallic ferrite oxygen carrier comprising $Cu_2FeMnO_4$.

Additionally and as stated, the $Cu_xFe_yMn_zO_{4-\delta}$ is an oxide compound where copper, iron, manganese, and oxygen may be present in any relative amount. In a particular embodiment, $0.5 \le x \le 2.0$, $0.2 \le y \le 2.5$, and $0.2 \le z \le 2.5$, and $-0.5 \le \delta \le 0.5$, and in another embodiment, $0.8 \le x \le 1.2$, $y \le 1.2$, and $z \ge 0.8$. The latter embodiment may tend to produce more stability over repeated cycles. As an example, FIGS. 5, 6, and 7 indicate TGA screening tests of tri-metallic ferrite oxygen carriers of various ratios, where approximately 50-60 mg of the $Cu_xFe_yMn_zO_{4-\delta}$ samples were reduced at 800° C. in 20 sccm $CH_4$ and 80 sccm $N_2$ and oxidized at 800° C. in a flow of air, with reactions times of about 20 minutes. Trace 513 at FIG. 5 indicates performance of $CuFeMn_2O_4$, trace 614 at FIG. 6 indicates performance of $CuFeMnO_4$, and trace 715 at FIG. 7 indicates performance of $CuFe_{0.5}Mn_{1.5}O_4$. FIGS. 5, 6, and 7 thus illustrate $Cu_xFe_yMn_zO_{4-\delta}$ embodiments where $0.8 \le x \le 1.2$, with $y \le 1.2$ such that $0.2 \le y \le 1.2$, and $z \ge 0.8$ such that $0.8 \le z \le 2.5$. As illustrated, the embodiments possess excellent stability over 20 cycles. For comparison and tested under similar conditions, FIGS. 8, 9, and 10 indicate TGA screening tests of tri-metallic ferrite oxygen carriers of $Cu_{0.5}Fe_{1.5}MnO_4$, $CuFe_2MnO_4$, and $Cu_2FeMnO_4$, respectively, where trace 816 at FIG. 8 indicates the $Cu_{0.5}Fe_{1.5}MnO_4$, trace 917 at FIG. 9 indicates the $CuFe_2MnO_4$, and trace 1018 at FIG. 10 indicates the $Cu_2FeMnO_4$. As indicated by comparison of FIGS. 5-10, stability may improve for embodiments where the tri-metallic ferrite oxygen comprises $Cu_xFe_yMn_zO_{4-\delta}$ and $0.8 \le x \le 1.2$, $0.2 \le y \le 1.2$, and $0.8 \le z \le 2.5$.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

The invention claimed is:

1. A method of combusting a carbonaceous fuel comprising:
   delivering a tri-metallic ferrite oxygen carrier to a fuel reactor, where the tri-metallic ferrite oxygen carrier comprise $Cu_xFe_yMn_zO_{4-\delta}$, where $-0.5 \le \delta \le 0.5$, and where $0.5 \le x \le 2.0$, $0.2 \le y \le 2.5$, $0.2 \le z \le 2.5$;
   mixing the carbonaceous fuel and the tri-metallic ferrite oxygen carrier in the fuel reactor and maintaining the fuel reactor at a reducing temperature, where the reducing temperature is sufficient to reduce some portion of the tri-metallic ferrite oxygen carrier and oxidize some portion of carbonaceous fuel, thereby combusting the carbonaceous fuel.

2. The method of claim 1 where the reducing temperature is from about 600° C. to about 1200° C.

3. The method of claim 2 where the tri-metallic ferrite oxygen carrier comprises an inert support and the inert support comprises from about 5 wt. % to about 60 wt. % of the tri-metallic ferrite oxygen carrier and the $Cu_xFe_yMn_zO_{4-\delta}$ comprises at least 30 wt. % of the oxygen, combined with the inert support.

4. The method of claim 3 where $0.8 \le x \le 1.2$, $y \le 1.2$, and $z \ge 0.8$.

5. The method of claim 3 where the inert support comprises alumina.

6. The method of claim 1 where the carbonaceous fuel is a gaseous carbonaceous fuel.

7. The method of claim 1 where the carbonaceous fuel is a solid carbonaceous fuel.

8. The method of claim 7 further comprising injecting a gasification agent into the fuel reactor.

9. The method of claim 1 where the tri-metallic ferrite oxygen is $Cu_xFe_yMn_zO_{4-\delta}$ an oxide compound where the oxide compound is a chemical compound of copper, iron, and manganese as cations and oxygen as an anion.

10. The method of claim 9 where the mixing carbonaceous fuel and the tri-metallic ferrite oxygen carrier in the fuel reactor generates a reduced carrier, and further comprising oxidizing the reduced carrier by contacting the reduced carrier and an oxidizing gas at an oxidizing temperature, where the oxidizing gas is comprises of oxygen, and where the oxidizing temperature is sufficient to generate an oxidizing reaction, where the reactants of the oxidizing reaction comprise some portion of the oxygen and some portion of the reduced carrier, and where the product of the oxidizing reaction is a re-Oxidized carrier, where the re-oxidized carrier comprises the oxide compound.

11. The method of claim 10 where the oxidizing temperature is from about 600° C. to about 1200° C.

12. The method of claim 11 where oxidizing the reduced carrier occurs in an oxidizing reactor, and further comprising:
   transferring the reduced carrier from the fuel reactor to the oxidizing reactor;
   supplying the oxidizing gas to the oxidizing reactor, thereby generating the re-oxidized carrier;
   transferring the re-oxidized carrier from the oxidizing reactor to the fuel reactor; and
   repeating the delivering step and the contacting step utilizing an additional quantity of the carbonaceous fuel as the carbonaceous fuel and the re-oxidized carrier as the tri-metallic ferrite oxygen carrier.

13. A method of combusting a carbonaceous fuel comprising:
   delivering a tri-metallic ferrite oxygen carrier to a fuel reactor, where the tri-metallic ferrite oxygen carrier comprise $Cu_xFe_yMn_zO_{4-\delta}$, and where $0.2 < x < 2.5$, $0.2 < y < 2.5$, $0.2 < z < 2.5$, and $-0.5 \le \delta \le 0.5$;
   mixing the carbonaceous fuel and the tri-metallic ferrite oxygen carrier in the fuel reactor and maintaining the fuel reactor at a reducing temperature of about 600° C. to about 1200° C. and generating a reduced carrier, thereby combusting the solid carbonaceous fuel;

transferring the reduced carrier from the fuel reactor to an oxidizing reactor;

oxidizing the reduced carrier by supplying an oxidizing gas to the oxidizing reactor, where the oxidizing gas at an oxidizing temperature from about 600° C. to about 1200° C. and generating an oxidizing reaction, where the reactants of the oxidizing reaction comprises some portion of the oxygen and some portion of the reduced carrier, and where the product of the oxidizing reaction is a re-oxidized carrier, where the re-oxidized carrier comprises $Cu_xFe_yMn_zO_{4-\delta}$; and transporting the re-oxidized carrier from the oxidizing reactor to the fuel reactor; and repeating the delivery step, the mixing step, the transferring step, and the oxidizing step utilizing an additional quantity of the carbonaceous fuel as the carbonaceous fuel and the re-oxidized carrier as the tri-metallic ferrite oxygen carrier.

14. The method of claim 13 where $0.8 \leq x \leq 1.2$, $y \leq 1.2$, and $z \geq 0.8$.

15. The method of claim 14 where the tri-metallic ferrite oxygen carrier comprises an inert support and the inert support comprises from about 5 wt. % to about 60 wt. % of the tri-metallic ferrite oxygen carrier and the $Cu_xFe_yMn_zO_{4-\delta}$ comprises at least 30 wt. % of the oxygen carrier combined with the inert support.

* * * * *